Jan. 9, 1945.  E. H. THOMPSON  2,366,882

FARE REGISTERING MECHANISM

Filed Feb. 3, 1943  7 Sheets—Sheet 3

INVENTOR.
ERNEST H. THOMPSON
BY Edmund W. E. Kamm
ATTORNEY

Jan. 9, 1945.  E. H. THOMPSON  2,366,882
FARE REGISTERING MECHANISM
Filed Feb. 3, 1943  7 Sheets-Sheet 4
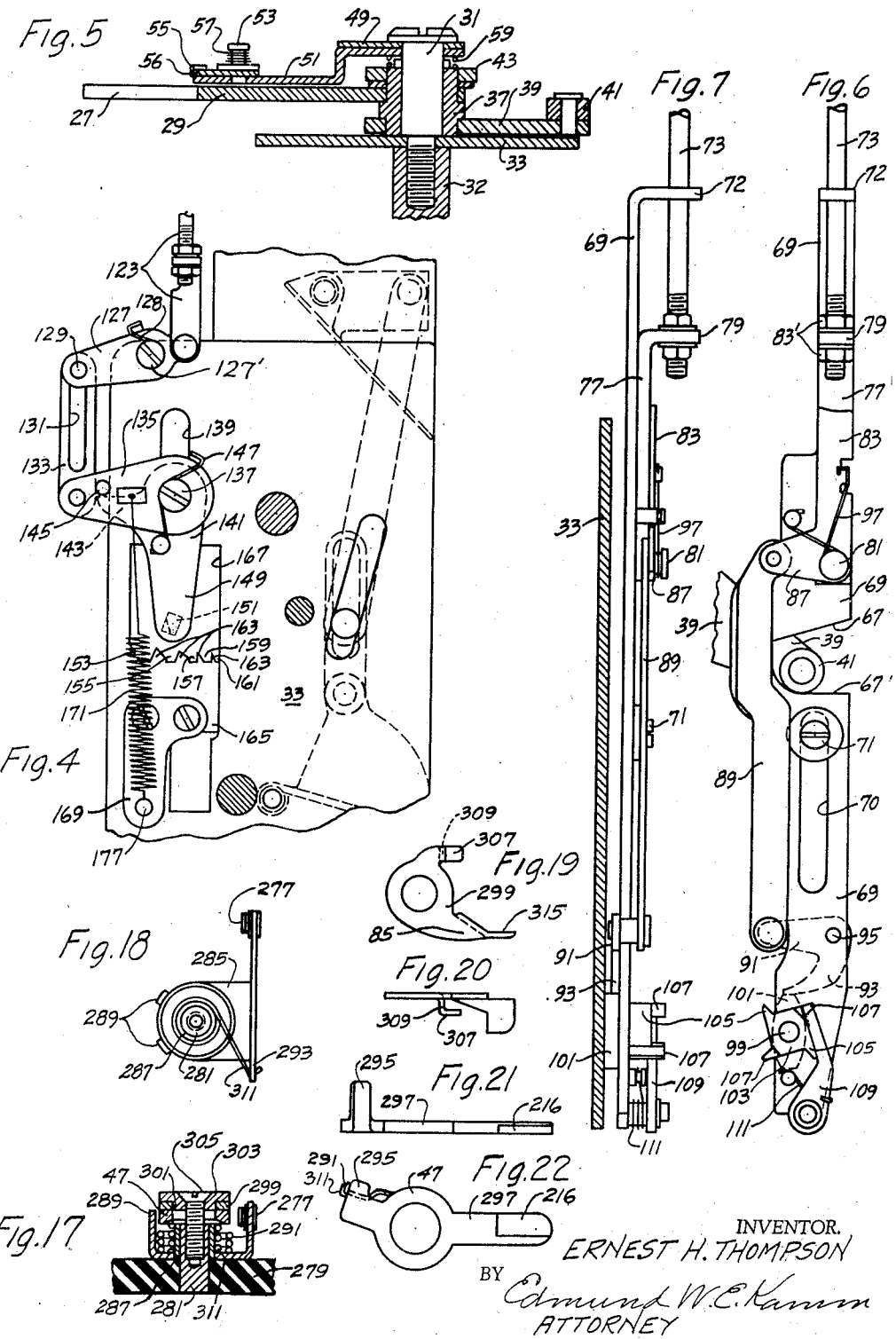

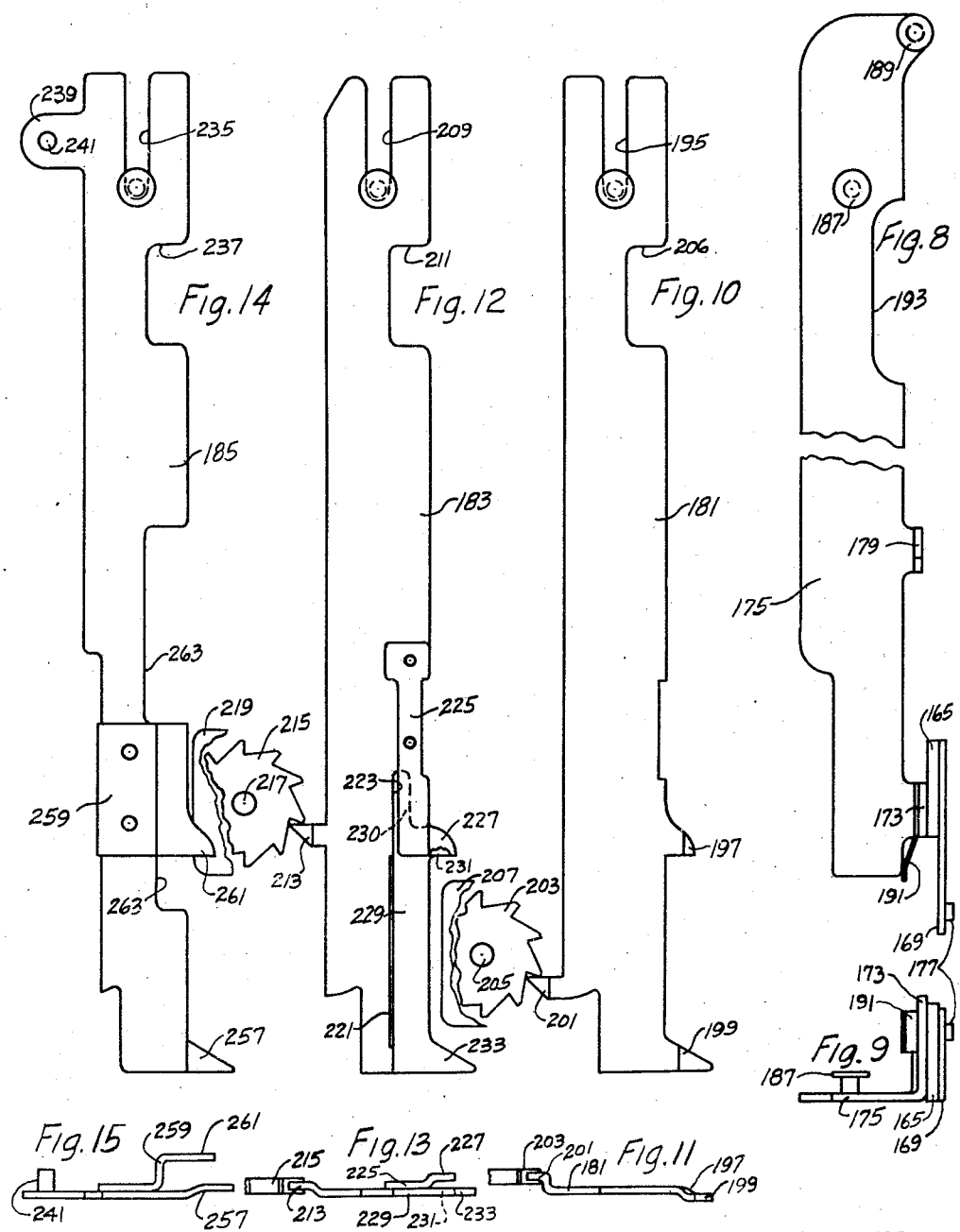

Jan. 9, 1945.  E. H. THOMPSON  2,366,882
FARE REGISTERING MECHANISM
Filed Feb. 3, 1943  7 Sheets-Sheet 6

INVENTOR.
ERNEST H. THOMPSON
BY Edmund W. E. Kamm
ATTORNEY

Jan. 9, 1945.  E. H. THOMPSON  2,366,882
FARE REGISTERING MECHANISM
Filed Feb. 3, 1943  7 Sheets-Sheet 7
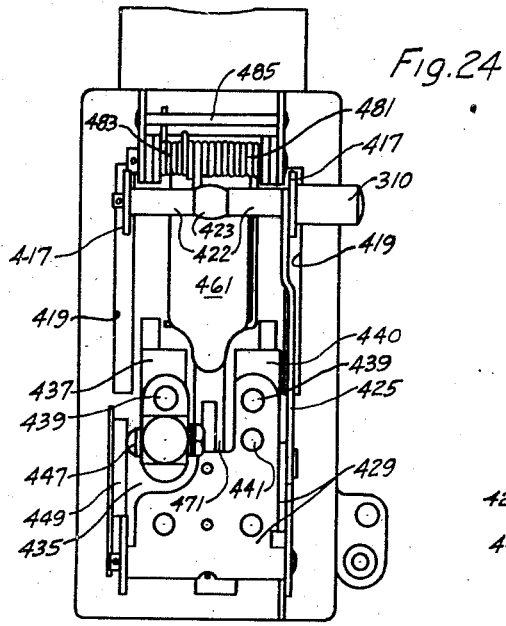
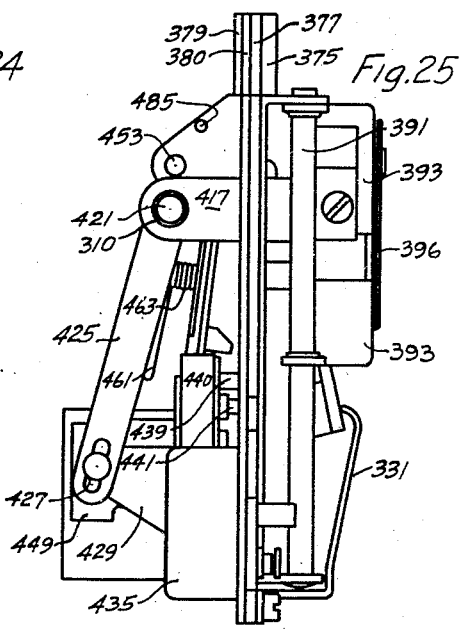
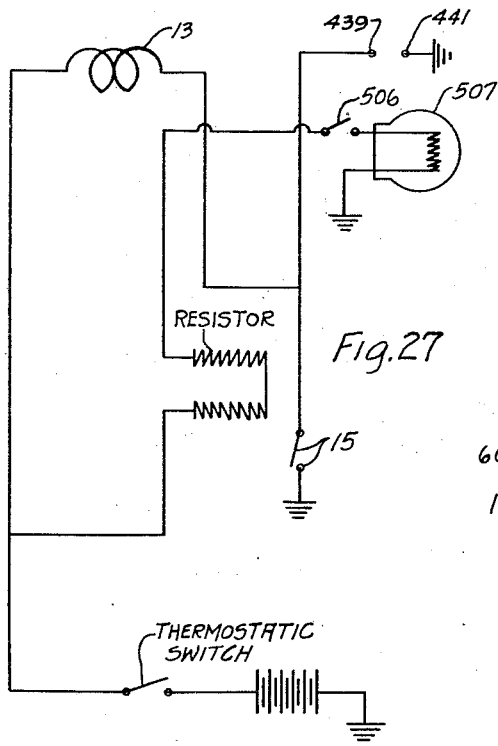
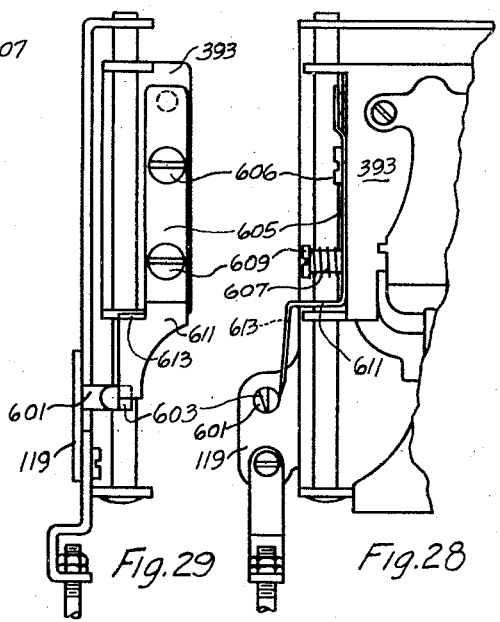
INVENTOR.
ERNEST H. THOMPSON
BY Edmund W. E. Kamm
ATTORNEY Patented Jan. 9, 1945

2,366,882

UNITED STATES PATENT OFFICE 2,366,882

FARE REGISTERING MECHANISM

Ernest H. Thompson, Winnetka, Ill., assignor to Johnson Fare Box Company, Chicago, Ill., a corporation of New York Application February 3, 1943, Serial No. 474,619

18 Claims. (Cl. 235—32)

This invention relates to an apparatus for calipering a check which is offered in payment for a service, for registering the value of said check and for indicating, by means of an audible signal, the value of the check deposited. More specifically, the apparatus is adapted to receive, register and indicate the value of any of a maximum of four checks which, in this case, are preferably a token having a diameter of .900 inch, a nickel coin, a dime, and a token .650 inch in diameter.

One object of the invention is to provide a fare register of the type described in which the mechanism is relatively simple yet which is positive in operation.

Another object of the invention is to provide an apparatus of the kind described having a normal cycle of two strokes for a five-cent coin or token and two cycles totaling four strokes for a ten-cent coin or token.

Another object of the invention is to provide a novel mechanism for inducing the two-cycle operation.

Yet another object of the invention is to provide a mechanism which resets the register selecting mechanism to normal position on the first stroke of a cycle.

Still another object of the invention is to provide means for actuating the register corresponding to the check deposited.

Another object is to accumulate all coins on a "cash" register and the tokens on separate token registers.

These and other objects will become apparent from a study of this specification in connection with the drawings which are attached hereto and made a part hereof and in which:

Figure 4 is a detailed view of the selector mechanism.

Figure 5 is a partially rotated section showing the actuator lever and the bell ringer.

Figure 6 is an elevation showing the repeat mechanism.

Figure 7 shows the mechanism of Figure 6 viewed from the left thereof.

Figure 8 is a side view of the actuating bar and the various elements attached thereto.

Figure 9 is a bottom view of the actuating bar.

Figure 10 is a side view of the first slide bar and its associated register.

Figure 11 is a bottom view of the bar of Figure 10.

Figure 12 is a side view showing the second slide bar, the insert therefor and the associated register.

Figure 13 is a bottom view of the parts of Figure 12.

Figure 14 is a side view of the third slide bar.

Figure 15 is a bottom view of the bar of Figure 14.

Figure 17 is a sectional view taken on the line 17—17 of Figure 1 showing the control switch.

Figure 18 is a view showing the movable contact of the switch and its associated parts.

Figure 19 is a plan view of the switch repeat lever.

Figure 20 is a bottom view of the lever of Figure 19.

Figure 21 is a side view of the switch actuating lever.

Figure 22 is a plan view of the lever of Figure 21.

Figure 24 is a view of the mechanism of Figure 23 taken from the right of that figure.

Figure 25 is a view of the mechanism of Figure 24 taken from the right thereof.

Figure 26 is a view of the repeat ring mechanism in the repeat position.

Figure 27 is a wiring diagram.

Figure 28 is a front elevation of the gage block control mechanism.

Figure 29 is a side elevation of the device of Figure 28.

Figure 1:
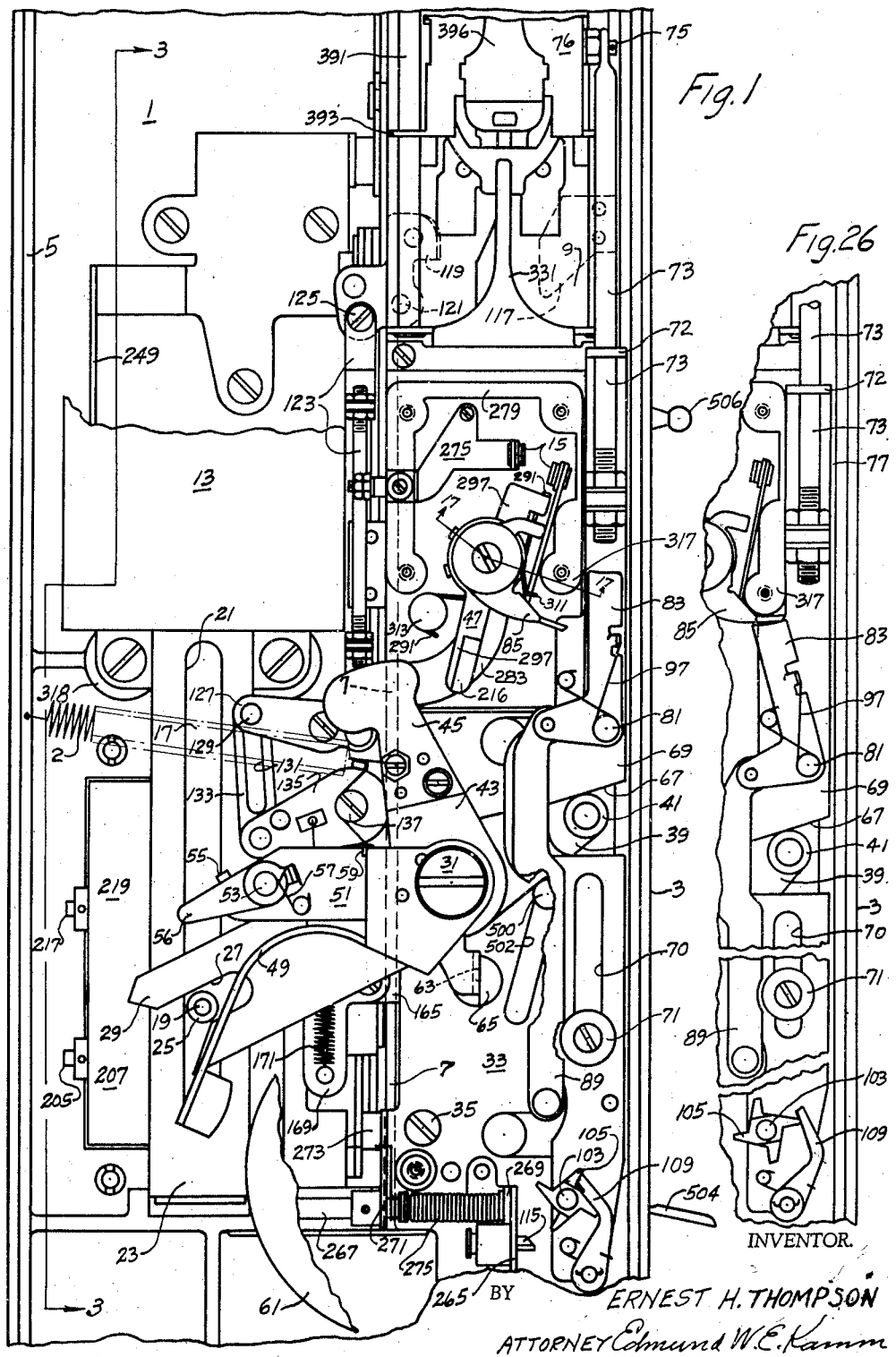
Figure 1 is a front view, with the cover removed, of the mechanism shown in the normal or rest position.
Figure 2:
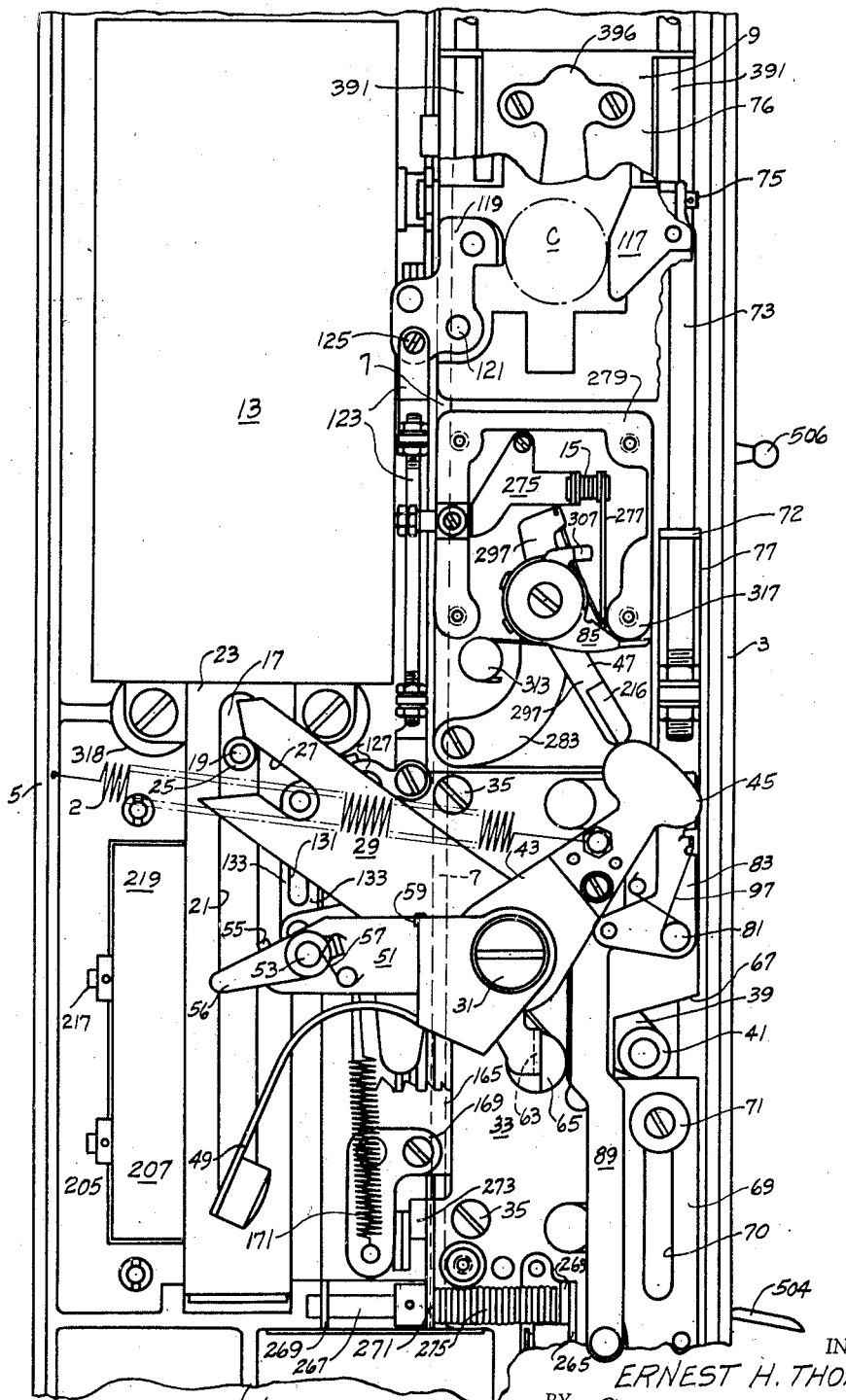
Figure 2 is a view similar to Figure 1 but showing the parts in the actuated position, i. e., nearly at the end of the first stroke of the cycle.

Referring now to Figures 1 and 2, the numeral 1 represents the front of a case having side walls 3 and 5 and an intermediate vertical wall 7. A cover 4 (Fig. 3) fits over the case to form the back of the unit.

A check handling mechanism indicated generally by numeral 9, which is later described, is adapted to receive the deposited check and comprises contacts forming a gap which is closed by the check. The gap is included in an electric circuit together with a solenoid 13 and a switch 15 which is connected in parallel across the gap.

The reciprocating armature 17 of the solenoid carries a pin 19 which projects through a slot 21 in the armature sleeve 23. A roll 25 is mounted on said pin and engages a slot 27 in lever 29 which is pivoted on a screw 31 set in a boss 32 (Fig. 5) fixed to a support plate 33. The plate is attached to the center wall 7 of the case by screws 35.

As is shown in Figure 5, the lever 29 is staked to a hub 37 which rides on screw 31. A second lever 39 is also staked on the hub substantially diametrically opposite lever 29 and carries a roll 41. A third lever 43 is fixed to the hub and extends substantially at right angles to the other two levers. The lever carries an extension 45 preferably of copper and which engages an arm 297 of actuating lever 47 of the switch 15. A spring 2, connected to the case 5 and lever 45, holds the parts normally in their counterclockwise position, Figures 1 and 2.

A bell ringer or hammer 49 is also pivotally mounted on the screw 31 and is fixed to an actuator lever 51 which extends in substantially the same general direction as the lever 49. The lever 51 carries a pin 53 and a bent up ear 55. A pawl 56 is pivoted on the pin and is urged into engagement with the ear by means of a spring 57.

In operation, the pawl 56 is picked up by the roll 25 as the armature is lifted, engages ear 55 to lift lever 51, and is pushed clear of the roll, whereupon the lever 51 and the hammer are returned by spring 59 to ring the bell 61.

The lever 51 carries a projection 63 which contacts a stop 65 which is set in the support plate 33 and serves to stop the lever 51 and the hammer as it is rotated by spring 59. The pawl 56 pivots when the roll 25 strikes it on the down stroke of the armature, and permits the roll to pass so that the hammer will be again actuated on the succeeding upstroke.

The roll 41 on lever 39 engages a notch 67 (see Fig. 6) in a slide bar 69 which is slotted at 70 to receive a guide screw 71 mounted in plate 33. The upper end of the bar is bent up at 72 and is perforated to receive a drag link 73 which is attached to a pin 75 on the check feeding box 76. A flat bar 77 having a bent up, perforated end 79 which also receives the lower end of the link 73, is fixed to the bar 69. A pair of nuts 83' straddle the end 79, are screwed onto the lower end of the drag link and serve to adjust the position of the box 76 relative to the lever 39.

Pivotally mounted on pin 81, which is riveted in slide bar 69, is a bell crank, one arm 83 of which actuates the switch lever 85, as will be described, and the other arm 87 of which is connected by a link 89 to one arm 91 of a cam follower 93 which is pivoted on a pin 95 fixed in bar 69. A spring 97 on pin 81 urges the arm 83 in a counterclockwise direction (Fig. 6).

Pivotally mounted in the lower end of bar 69 is a shaft 99 which carries on the end adjacent follower 93 a two-lobe cam 101, the lobes of which are diametrically opposed. On the opposite end of the shaft is mounted a ratchet 103 having two full teeth 105 and two half teeth 107. A holding pawl 109 is pivotally mounted on the extreme lower end of bar 69 and is urged into engagement with the ratchet by a spring 111.

The ratchet 103 moves up and down with bar 69 on each actuation of the machine and is adapted to be rotated by coming into contact with a pawl 115 (Fig. 1) which may be positioned, prior to the upstroke of the bar, by a mechanism described below.

As is shown in Figure 2, the check C is fed to the calipering station where it is disposed between a fixed anvil 117 and a gauge block 119 which is pivotally mounted on the frame at 121.

A link 123 is connected to the gauge block at 125 and at its other end to a lever 127 (Figs. 1 and 4). This lever is pivotally mounted on screw 127' set in plate 33 and its other end carries a headed pin 129 which rides in a slot 131 in a link 133. A spring 128 (Fig. 4) holds lever 127 in its extreme clockwise position and holds block 119 out of the path of the check. The lower end of the link 133 is pivotally connected to a lever 135 which is in turn pivotally mounted upon a headed pin 137 which is slidably mounted in a slot 139 formed in plate 33.

A bell crank 141 is pivotally mounted on the pin 137, and one arm 143 thereof is engaged by a pin 145 carried by lever 135 and serves to limit the clockwise rotation of crank 141 relative to lever 135 which is induced by the spring 147.

The depending arm 149 of the bell crank carries a tooth 151 which is adapted to enter one of the spaces 153, 155, 157, 159 or 161 which are formed by the five teeth 163 on the slide plate 165. This plate rides in an elongated slot 167 formed in the plate 33 and is provided with an outer guide plate 169 which slides on top of plate 33 to hold the slide in position in the slot. A tension spring 171 connects the guide plate 169 and the lever 135 and serves normally to hold the levers 135 and 141 in their extreme counterclockwise positions in which the tooth 151 engages the right-hand edge of the slot 167, as is evident in Figure 4.

Figure 16:
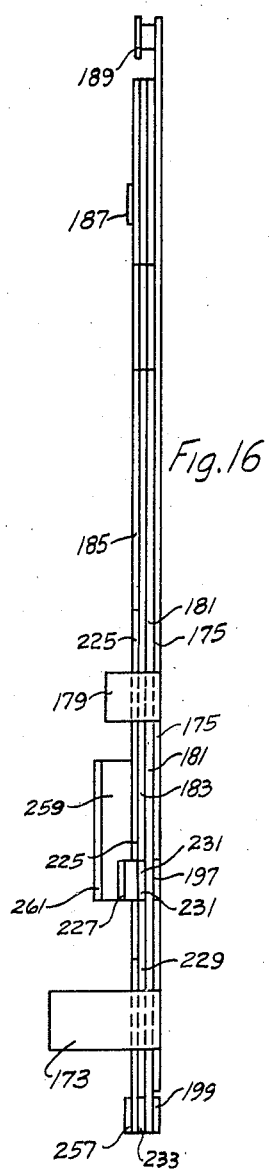
Figure 16 is an assembly view of the actuating bar and the slide bars viewed from the right in Figure 3.

The slide plate 165 is fixed to a bent over ear 173 formed on the actuating bar 175 as is shown in Figures 8 and 9, while the guide plate 169 is fixed by screws to the outer side of plate 165. The guide plate also carries the anchor 177 for spring 171. The actuating bar also carries a second bent over ear 179, as shown in Figure 16, the purpose of which is to actuate the pin 137 as will be described later.

A resetting pin 187 (Figs. 3 and 8) is set in the bar 175 while an actuating pin 189 is set in the upper portion of the bar. A leaf spring 191 is also attached to the ear 173 in the region of the bars 181, 183, 185 and is adapted to hold the lower ends of these bars in place. The bar 175 is also provided with a recess 193 which permits the bar to clear other parts of the machine.

The bar 181 is provided with a longitudinal resetting slot 195 which is open at one end and which receives the resetting pin 187. A projection 197 is formed on the right-hand edge of the bar (Figs. 10 and 11) and is offset from the plane of the bar so that it overlies the actuating bar 175 when the parts are assembled (see Fig. 16).

A second projection 199 is formed on the same edge of the bar as 197 but at the lower end thereof and this too is offset from the plane of the bar in the same direction as the projection 197.

The opposite edge of bar 181 carries a ratchet actuating pawl 201 which is offset from the plane of bar 175 in a direction opposite to the projections 197 and 199 so that it lies substantially in the plane of bar 183 when the parts are in assembled position. This pawl lies in the plane of the ratchet 203 which, through shaft 205, actuates the full fare or .650 token register 207. A clearance notch 206 is also provided in the right-hand edge of the bar.

The slide bar 183 is provided with a resetting slot 209 similar to 195 and with a clearance notch 211. A ratchet actuating pawl 213 is formed on the left edge of the bar (Figs. 12 and 13) and this is offset from the plane of the bar so that it lies partly in the plane of the adjacent bar 185 and in the plane of a ratchet 215 which drives a shaft 217 which, in turn, drives a money value register 219.

The lower right-hand edge of the bar is recessed at 221 and is provided with a downwardly open, longitudinal slot 223. A strip 225 is fixed to the bar on the surface adjacent bar 185 so as to lie in the plane of this bar and overlies a part of the slot. This strip is provided with projection or tooth 227 which is offset so as to extend beyond the plane of the adjacent bar 185 a substantial distance as shown in Figure 16.

A secondary slide member 229 is provided with a projection 230 which enters the slot 223 and this slide bears against the recessed edge of the bar 183. The member 229 is provided with a projection 231 which lies in the plane of the member and of bar 183 and is thus disposed on a level with, and between the projections 197 and 227.

The lower end of member 229 is provided with a cam projection 233 which is in the plane of the member and on a level with the projection 199 on bar 181.

The slide bar 183 can thus move independently of the member 229 but when the latter is lifted, as will be described, the bar 183 will follow and the register 219 will accordingly be actuated.

Figure 3:
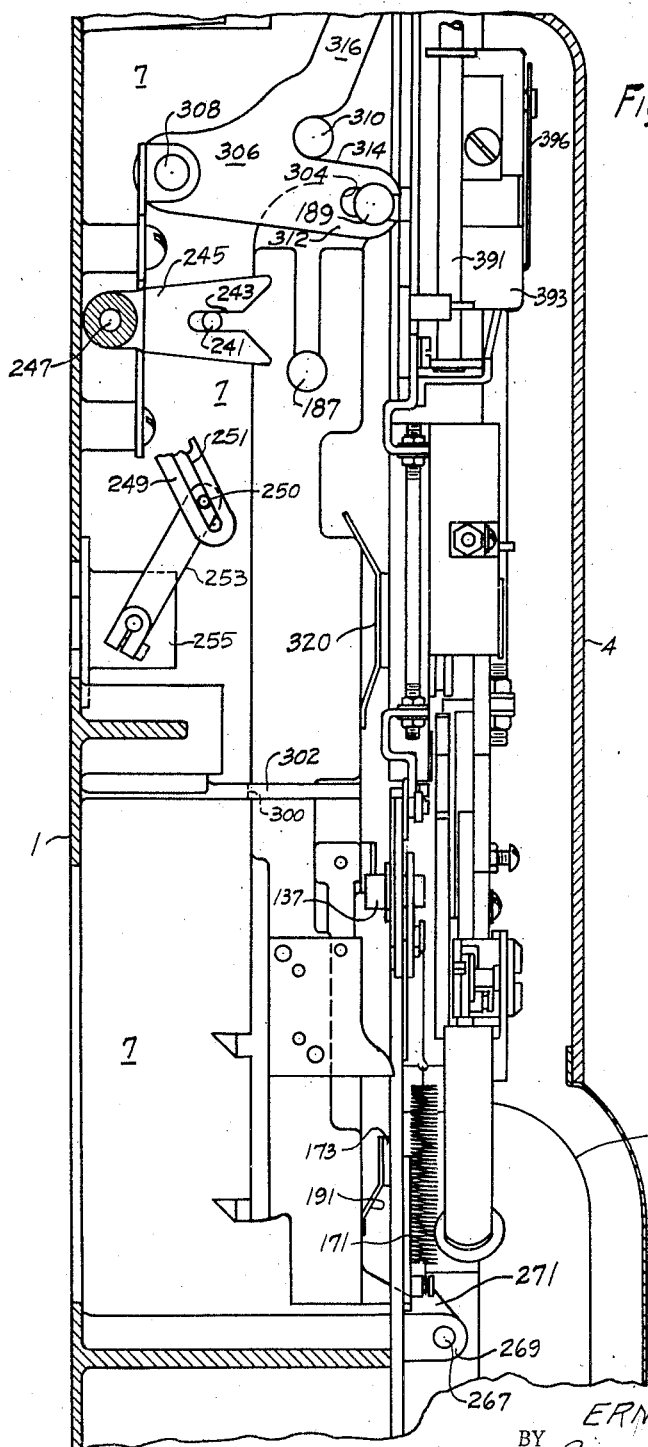
Figure 3 is a side view of the mechanism taken on the line 3—3 of Figure 1 with solenoid 13 removed.

A third slide bar 185 is provided with a resetting slot 235 and a clearance slot 237. An ear 239 on the left edge of the bar (Figs. 14 and 15) carries a pin 241 which is received in a slot 243 in lever 245 (Fig. 3). This lever is fixed on a shaft 247 which, in turn, operates a lever 249. The latter is provided with a slot 251 in which is engaged a pin 250 in one end of a crank 253 which actuates the half fare or .900 token register 255.

The bar 185 carries a cam projection 257 at its lower end which is at the same level and which projects in the same direction as the cams 199 and 233. This cam is offset from the plane of the bar and in a direction away from the adjacent bar 183, as shown in Figure 16.

An offset plate 259 carries a projection 261 and is fixed to the side of bar 185 which is away from the bar 183. This projection is on a level with, and extends in the same direction as the projections 227, 197 and 231.

Bar 185 is cut away at 263 to clear the strip 225 which is fixed to bar 183, as described above.

It should be noted at this point that the projections 197, 231, 227 and 261 are in direct alignment with the spaces 159, 157, 155 and 153 respectively of the slide plate 165 so that when the tooth 151 is positioned in one of the notches, the projection aligned therewith is picked up by the tooth and the corresponding slide bar is actuated.

Referring now to Figures 1, 2 and 3, the ratchet 103 of the repeat ring mechanism is actuated by the tooth 115 which is mounted on a lever 265. The latter is carried on a shaft 267 mounted in bearings 269, and which carries a lever 271 which extends upwardly and carries an ear 273 which is disposed in the region of the cam projections 199 and 233 on bars 181 and 229. A spring 275 urges the lever 271 toward the bars 181 and 229 and moves the tooth 115 out of the path of the ratchet 103.

In the present case, since it is desired to cause a repeat ring only upon the actuation of either one of two of the bars, the ear 273 is disposed adjacent the cams 199 and 233 only.

The bars 181, 183 and 185 are assembled together as shown in Figure 16 and the resetting pin 187 occupies the resetting slots of the various bars. All of the bars are received in a slot 300 in a web 302 (Fig. 3) while operating pin 189 enters a slot 304 in a bell crank 306 which is pivotally mounted on the frame at 308. An operating roll 310 is mounted on the check handling mechanism and extends above the arm 312 of the bell crank and acts upon the upper edge 314 thereof to depress it. The other arm 316 of the bell crank is positioned above the roll 310 and is contacted thereby to rotate the crank in the counter-clockwise direction on the upward stroke of the check handling mechanism.

The reset pin serves to support the bars at their upper ends. A leaf spring 320 having two arms bears against the bars to hold them in position.

Switch

The holding switch 15 (Figs. 1, 2, 17 to 22) comprises the fixed pole 275 and the movable pole 277. These parts are mounted on an insulating base 279 which is supported on the case (Figs. 1, 2 and 17).

The post 281 is set in the base 279 and the ground strip 283 is in contact with the post. The movable pole 277 is mounted upon an ear 285 which, in turn, is staked upon a hub 287 which fits over the post 281. Two prongs 289 are bent up from the ear to serve as retainers for the springs described below.

The spring 311 is connected at one end under the edge 293 of the pole 277 and at the other end bears on the projection 295 on lever 47 (Figs. 21 and 22).

A repeat ring control member 299 is pivotally mounted on the hub 301 of a washer 303 which is held in place on top of the lever 47 by means of screw 305. The member 299 is provided with an offset projection 307, the vertical wall 309 of which lies in the path of the lever 47.

A spring 291 is hooked over an anchor 313 and over the operating ear 295 on lever 47. Spring 291 therefore normally rotates levers 47, 299 and 285 in a clockwise direction so that contacts 15 are opened. Lever 47 is adapted to engage 309 on the lever 299. Spring 311 normally keeps lever 47 in contact with wall 309 of lever 299 and the projection 307 of 299 in contact with pole lever 285, since the spring is anchored at one end on lever 47 and at the other end on 285. When the projection 307 is rotated counter-clockwise by lever 83, engaging projection 315, this relation is held by virtue of spring 311 until contacts 15 engage, and thereafter the levers 47 and 299 move on, independently of 285, and further stress spring 311 until 315 comes in contact with abutment 317 of housing 279.

When the lever 47 is moved in the counter-clockwise direction by the lever 45 (Fig. 2), levers 47, 299 and 285 revolve counter-clockwise as a unit until contacts 15 are closed. Thereafter, levers 47 and 299 move on independently until 315 contacts abutment 317. Then lever 47 moves on alone, stress being absorbed in spring 311.

When the lever 45 passes beyond arm 297, the parts just described are rotated in the reverse direction under the action of spring 291 and this action will reopen the switch 15.

However, if the projection 315 of lever 299 is held against abutment 317 by lever 83, the projection 307 will be held away from pole 277 and the switch 15 will remain closed under action of spring 311 for another cycle.

The arm 297 of lever 47 is bevelled at 216 to permit lever 45 to pass it on the return stroke. Since the lever 47 merely rests on springs 291 and 311 it can easily be deflected out of the path of lever 45 upon contact therewith.

*Check handling mechanism*

Figure 23:
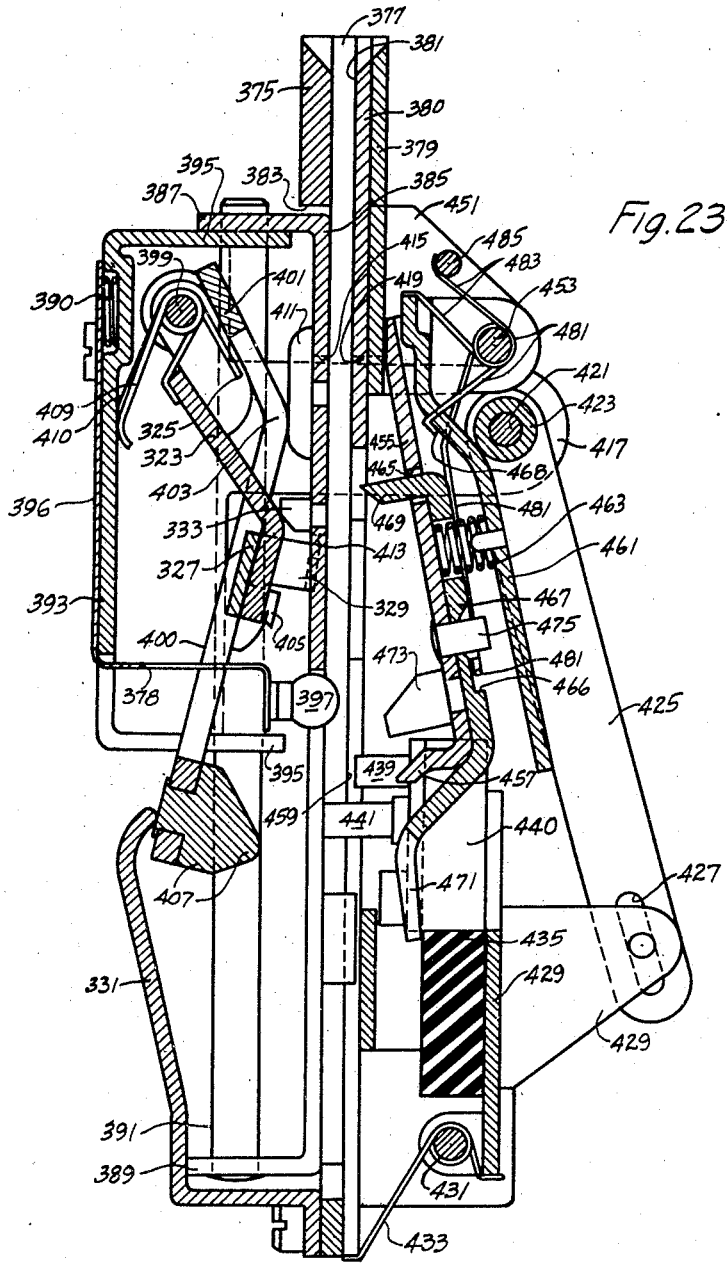
Figure 23 is a sectional view of the check receiving and handling mechanism.

The check handling mechanism is shown in Figures 23, 24 and 25 in which the check chute is formed by laminations 375, 377, 379 and 380, 377 of which is cut out to form the passage 381 for the check. These laminations are suitably fastened together and are fixed to bosses on the case 1 and the web 7. The element 375 terminates at 383 and a bracket 385 is inserted which has upper and lower transverse flanges 387, 389. Vertical guide rods 391 are mounted in the flanges and extend between them, and a check control box 393 is slidably mounted on the rods by means of ears 395 which are perforated to receive the rods.

Mounted on the exterior of the box (Fig. 23) is a flexible contact carrier 396 which is bent inwardly under the box and carries a contact point 397 which is urged toward the right by a spring 390. Passing through the box is a shaft 399 upon which is pivoted, by means of spaced ears, a lever 401. This lever is bent at 403 and carries a projection 407. This lever is open in the center and is really formed of two bowed arms 400 which are integrally joined at the top and bottom. Each arm 400 carries a check pick-up pawl 405 which is bevelled on the inner side to engage the upper edge of a check.

A second lever 323 is formed with ears 325 which are mounted on shaft 399. A U-shaped bail 327 is fixed on the lower end of this lever and the ends thereof extend toward the check chute and are formed as pick-up pawls 329 which project through slots in 385. These pawls are disposed above, are a greater distance apart than, and extend into the slots farther than the pawls 405 so as to engage a check of greater diameter.

A spring 409 is coiled about shaft 399 and engages the box and the lever 323 to force the lever toward the check chute. A second spring 410, similar to 409, is disposed against the underside of lever 401 and forces it into engagement with the cam lug 411 which is fixed on the plate 385. Lever 401 is bent at 403 to form a follower which is adapted to ride onto and off from the cam 411.

A rigid cam 331, shown also in Figure 1, is fixed to the lamination 377 at the bottom of the unit and each time the check control box descends, the upper end of cam 331 engages a slot 378 in the contact carrier 396 to cam contact 397 out of the check chute when the check is in the calipering position. In the case of a check requiring two cycles of the machine, this prevents the contact 397 from pushing the check through the machine prematurely.

A second cam lug 333 is fixed to 385 and is located at the bend in lever 323 when the parts are in the check receiving position. It serves to retract the pawls 329 from the check chute at the upper end of the stroke. It will be noted that the lug 411 is longer than lug 333 so that when the box is moved downwardly, the pawls 329 will first enter the check chute and thereafter the pawls 405 will follow.

The plate 385 is slotted at 415 on the outer sides of the slots 413 through which the pick-up pawls enter the chute, and the box carries a pair of arms 417 which project through 415 and aligned slots 419 in plates 377, 379 and 380. A shaft 421 connects the arms and a roll 423 is supported on the shaft and positioned centrally by spacers 422. A link 425 is pivoted on the right end of the shaft (Fig. 24) and has a slot 427 at its lower end which receives a pin carried by the plate 429.

The plate 429 is pivotally supported on shaft 431 and is urged counter-clockwise (Fig. 23) by spring 433. The plate carries a block of insulating material 435 which is formed with a right-hand and a left-hand projection (Fig. 24) numbered 440 and 437 respectively. Each projection carries a short contact 439 and a long contact 441 which are electrically connected, but each pair of contacts is insulated from the other pair. The contacts on 440 are grounded to the frame through plate 429. The latter is cut away in the region of 437 and a post, which is connected with contacts 439, 441 on projection 437, is mounted on the rear of block 435 and carries a laterally directed spring contact 447 which is adapted to slidably contact plate 449 which is connected by a wire to the electric circuit. The short contacts 439 are disposed above the long ones 441.

Mounted on lamination 380 below 379 is a bail 451 which carries a shaft 453. A lever 455 is mounted for rotation on this shaft by means of suitable ears and carries an inwardly projecting pawl 457 at its lower end. The tip of the pawl is adapted to enter an opening 459 in the plate 380 between the projections 437 and 440.

A second lever 461 is also rotatably mounted by means of ears on shaft 453 and intermediate its ends supports a coil spring 463. A slot 465 is formed in lever 455 and a plate 467 has a hook 469 formed on the upper end which passes through the slot 465 and enters the check chute through an opening in plate 380. The end of the hook is bevelled upwardly as shown in Fig. 23. The lower end 471 of the plate 467 is bifurcated and reduced in width so as to enter the space between projections 437 and 440 and is bent inwardly above the bifurcation. This plate is loosely held in place by a pin 475 and hook 469. A pin 473 is set in lever 455 and enters the slot 459 between projections 437 and 440.

A relatively strong spring 481 is coiled about shaft 453 and one end engages a groove 466 in plate 467 while the other end engages a shoulder 468 near the upper end of lever 461. The spring tends to spread the levers 455 and 461 as does spring 463.

A relatively weak spring 483 is also coiled about shaft 453 and one end is hooked over the upper edge of lever 461 while the other end bears against a fixed rod 485. This spring returns both levers 455 and 461 to the Figure 23 position when the roll 423 moves to its upper position. The upper end of lever 461 abuts the upper end of 455 to limit the relative rotation of these levers under the action of springs 481 and 463.

*Operation*

The deposited check will rest on the long contacts 441 which block the chute in the rest position of the check handling mechanism (Fig. 23), and while this gap is bridged, the operating circuits described below will be established. A second gap in parallel with the gap just described is formed by the short contacts 439 and the contact 397 which is urged into contact with the check. Thus a circuit is sure to be formed by any check which enters the chute.

As soon as lever 323 leaves cam 333 it will be swung counter-clockwise and its pawls 329 will enter the check chute. As the box travels a short distance farther, the lever 401 leaves cam 411 and is rotated to position its pick-up pawls 405 in the check chute so that if the check is a small one it will be engaged by these pawls. If the check is a large one it will be engaged by the pawls 329 and the pawls 405 will be held out of the chute by the check.

During this operation, the plate 429 and its associated parts are motionless because of the lost motion slot 427 in link 425.

The roll 423 will, during the same period, press lever 461 in a clockwise direction against the action of spring 483. Spring 481 will transmit the motion to lever 455 so that hook 469, pin 473, pawl 457 and the bifurcated end 471 will enter the openings provided for them in plate 380.

Pin 473 will engage the check and will hold it in yielding contact with plate 385 in position to be contacted by the pick-up pawls. The hook 469 enters the chute to support any additional check which may be inserted and prevent its downward motion until the initial coin has been cleared.

Substantially at the same time that the pick-up pawls enter the slots 413, the lost motion in 425 is taken up and the contacts 439, 441 will be rotated clockwise (Fig. 23) to withdraw the contacts from the check chute, and thereafter the check is pushed downward by the engaged pick-up pawls. The switch 15 has been closed by this time to hold the solenoid circuit closed. The check is moved out from underneath 473 to pawl 457, is engaged by pawl 457, is thereafter yieldably engaged by the bifurcations 471 and is held thereby against plate 385. The pin 473 or pawl 457, depending upon the size of the check, serves to engage the upper edge of the check which passes it to prevent it from being dragged upwardly as the pick-up pawls return to their upper position. Because the narrow dimension of the chute may be large enough to admit two thin checks of the smaller diameter, face to face, the check engaging projections on the pick-up pawls 405 are of less height than the thickness of the thinnest check used, and since the check is held against plate 385 by 473, the check adjacent the pick-up pawls will be stripped from any check which may lie in face to face relation with the check engaged by the pick-up pawls so that the latter check will be stripped from the former and only one check will be moved to the calipering station. The end 471 of lever 467, when it is positioned in the check chute, holds the check flat against 385 at the calipering station.

Assuming that two, thin, small checks have been so deposited, when the one check is held at the calipering station for a repeat operation, finger 407 will rest upon the check to prevent check pick-up pawls 405 from entering the chute, and will thus prevent the second check from being moved to the calipering position during the second cycle.

As will be seen from the following description, the check box is prevented by stop 83 (Fig. 6) from returning to the position where lever 461 is released by roll 423 when a repeat ring is required. Accordingly, the projection 471 will be in contact with the check at the calipering station and it will be prevented from dropping into the check receptacle.

A check deposited in the check chute will close one or more of the gaps described above and energize the solenoid 13 with the result that the armature 17 and roll 25 are drawn upwardly very rapidly.

On this stroke of the cycle a number of events occur which are set out below.

The roll 25 rotates the lever 29 clockwise (Fig. 1), and after a small distance it also contacts the pawl 56 and rotates lever 51 and hammer 49 clockwise against the action of springs 59 and 2. As the roll 25 nears the end of its upward stroke, the pawl 56 is passed and the spring 59 drives the hammer counterclockwise against a stop and the hammer strikes a bell 61.

The lever 45 which is integral with 29 engages lever 47 of the control switch 15 and rotates the latter in a counterclockwise direction. The contacts 275 and 277 which form this switch are held normally open by the projection 307 on lever 299 under action of spring 291. However, as the above described engagement occurs, the lever 47 is rotated against the action of spring 291 and the contacts of the switch will be closed. Thus, a circuit which is parallel to that through the coin gap is established prior to withdrawal of the contacts 439, 441 as will be described.

When the parts reach the Figure 2 position, the lever 45 passes under lever 47 and the contacts are returned to the switch-open position by the spring 291.

The lower edge of lever 39 which is carried by the lever 29 engages a roll 500 to force it downwardly in a slot 502 (Fig. 1) and this actuates the actuating linkage of a check display shelf (not shown) which serves to display the last registered check through a window formed in the right wall of the case (Fig. 1). Actuation of the shelf dumps the check on display to a shelf 504 which may be actuated at will by the operator to retrieve the checks collected.

Lever 39 carries a roll 41 which engages notch 67 (Fig. 6) in actuating bar 69. This bar is forced downwardly as the solenoid is actuated, as described above, and the link 73 which is connected to the pin 75 of the check handling box transmits the motion of the bar to the box 76. The box being thus actuated, the check pushers 329 and 405 (Fig. 23) are forced into the check chute 381 by springs 409 and 410; the stops 469, 473, 457 and 471 and pawl 407 enter the chute to perform the various functions described above and the contacts 439 and 441 are withdrawn from the check chute.

Referring now to Figure 3, the roll 310 carried by the shaft 421 of the check box moves downwardly until it engages the upper edge 314 of the bell crank 306. The crank is rotated clockwise and the actuating slide bar 175, which carries pin 189 which rides in slot 304 of the lever, is depressed. The pin 187 in the actuating bar which rides in the slots 195, 209 and 235 of the slide bars 181, 183 and 185 respectively, engages the bottoms of these slots and resets the bars to their lowermost positions.

As the actuating bar 175 is lowered, the slide plate 165, being fixed to the actuating bar, moves downwardly with it. The spring 171 causes the pin 137 and the levers 135 and 149 to follow the downward motion of plate 165. The pin 137 is stopped by the end of the slot 139, while plate 165 continues to move a short distance sufficient to disengage the pin 151 from the teeth 163.

The projection 179 on 175 follows the pin 137 downward to insure its reaching the end of slot 139 so that projection 151 will clear projections 197, 231, 227 and 261 on slide bars 181, 229, 183 and 185 respectively, and thus allow spring 171 to rotate levers 135 and 149 to position projection 151 in accordance with the check in calipering position.

The downward movement of the levers 135 and 149 with pin 137 tends to pull down on link 133 and when the upper end of the slot 131 engages the pin 129 on lever 127, it tends to rotate the latter counter-clockwise (Figs. 1, 2 and 4). This action transmits an upward thrust to link 123 and tends to rotate the gage block 119 about its pivot 121 in a clockwise direction so that the block moves toward the anvil 117 (Fig. 2). This motion of the gage block is limited by the diameter of the check which is disposed adjacent the anvil, and consequently, the rotative position of lever 141 and the position of tooth 151 with respect to the teeth 163 will be governed by the diameter of the check which occupies the calipering position.

When no check is in this position, the tooth 151 will engage the right-hand edge of the slot 167 and will enter the notch 161 as the slide plate 165 returns. When the check measured is a .650 token, the tooth will enter the second space 159; when a dime is calipered the tooth enters the third space 157; when a nickel is calipered the tooth enters the fourth space 155; and when a .900 token is calipered, the tooth will enter the fifth space 153. Obviously, the arrangement of teeth 163 may be changed so that tokens of different diameters than those disclosed above may be used, the position of the teeth being governed by the position of tooth 151 which is determined by the diameter of the check.

The tops of the teeth 163 are bevelled and the tooth 151 is triangular so that differences in diameter of the checks which result from wear will not disturb the operation of the machine. If the tooth 151 is located within reasonable distance of the proper notch, the lever 149 will be cammed in counter-clockwise direction relative to the lever 135 against the action of spring 147, and the tooth 151 will enter the proper notch.

As will appear from Figures 16 and 4, the projections 197, 231, 227 and 261 which are mounted upon slide bars 181, 229, 183 and 185 respectively, are disposed in substantial alignment with the notches 159, 157, 155 and 153 respectively, so that when tooth 151 enters a notch the corresponding slide bar will be picked up as the solenoid moves downward on the return stroke.

It should be noted here that since the .650 token and the dime are the only checks which require two cycles of operation of the machine, the lever 271 (Figs. 1 and 2) carries an ear 273 which is wide enough to be contacted by the projections 199 and 233 on the bars 181 and 229 respectively. None of the other bars will actuate this lever.

The solenoid armature 17 is returned to its lower position by means of a spring 2 and the weight of the armature. The levers 29, 45 and 39 are now rotated counter-clockwise and the lever 45 engages the bevelled edge 216 of lever 47 and the latter is cammed downwardly (Figs. 1 and 2) to permit lever 45 to pass it. This is possible because lever 47 floats on the springs 291 and 311. The switch 15 is not, therefore, actuated upon the return stroke.

As the roll 25 on the armature contacts pawl 56 on the bell operating lever 51, it will depress and pass the pawl which will then be restored above the roll by spring 57.

The rotation of lever 39 will free roller 500 and allow the upper shelf (not shown) to return to check holding position. It will also slide the bar 69 upwardly and by means of link 73 restore the check box and all of its associated parts to the starting position. This, however, occurs only if the stop lever 83 has not been rotated and occupies the position of Figure 6. This is the position occupied by it upon the upstroke of the first and only cycle of the device when a .900 token or a nickel has been inserted in the machine or the upstroke of the second cycle of the device when a dime or a .650 token has been used. The condition which obtains upon the upstroke of the first cycle when a dime or .650 token has been used will be described below.

As the check box returns to its uppermost position, the roll 310 (Fig. 3) will leave the edge 314 of arm 312 of bell crank 306 and will cam arm 316 of the bell crank 306 out of its way, and thus bell crank 306 will be rotated counter-clockwise. The actuating bar 175 will be lifted and so will the guide plate 165. The tooth 151 will engage the notch adjacent which it is set and as the plate and tooth move upwardly, the tooth will pick up the corresponding slide bar projection. We have assumed that stop lever 83 will not be actuated and we must there assume that a .900 token or a nickel has been used. If a .900 token was used, the bar 185 will be raised and as this occurs the pin 241 operates lever 245 and shaft 247 to actuate the counter 255 one step to indicate one half fare.

If a nickel was used the bar 183 will be raised and the pawl 213 thereof will actuate ratchet 215, shaft 217 and the cash fare register one step to indicate that one half fare has been paid.

The cycle is completed with the actuated slide bar in the raised position and it is reset upon the first stroke of the succeeding cycle.

If we assume now that the fare paid was a dime, the tooth 151 would be connected with the short bar 229 which would be lifted, and since it fitted into the bar 183 the latter will also be raised and the ratchet 215 and the counter 219 will be actuated as before to register one half cash fare. However, as bar 229 lifts, the projection 233 will cam lever 271 outwardly to rotate shaft 267, lever 265 and pawl 115 in a clockwise direction (Figs. 1, 2 and 3) so that as bar 69 is raised, the narrow ratchet tooth 105 will engage the pawl and will be rotated 90 degrees. The cam 101 will be similarly rotated and follower 93 will be rotated counter-clockwise (Fig. 6) by link 89, lever 87 and spring 97. The stop 83 will then be rotated counter-clockwise and positioned to engage the ear 315 of switch lever 299 (Figs. 1, 19 and 26) and force it against the abutment 311. The projection 307 is thus withheld from lever 285 (Fig. 18) and switch 15 is thus reclosed so that a second cycle is started.

The link 73 is of such length that when stop 83 engages abutment 311, the check box will be held away from its uppermost position far enough to prevent withdrawal of the pawls 471 and 407 from the chute so that the check will be retained in the measuring position.

Upon the second upstroke of the solenoid, all of the events of the first stroke are repeated, and upon the return stroke of the solenoid the cash fare register is operated again so that it now indicates a full fare. The pawl 115 is again positioned and will engage a wide tooth 107 of the ratchet which will be rotated 90 degrees to restore the stop 83 and associated parts to the Figure 6 position. The switch will not therefore be closed and the operation will stop with the return of the parts to the original position. Since the check box is restored fully on this stroke, the check will be released and will fall upon the restored upper shelf to be displayed thereon. If the full fare check were accidentally ejected at the end of the first cycle, the pawl 115 would not be positioned by a slide bar, therefore it is necessary to provide intermediate, wide teeth on this ratchet so that it will be rotated by the pawl even though the latter is not positioned and so that the machine will cease operating at the end of the cycle which is in progress.

If the .650 token were used the functioning of the machine would be the same as that described for the dime operation except that the bar 181 would be raised and the tooth 201 would actuate ratchet 203, shaft 205 and the full fare token register 207. This register would be operated one-half unit on the first cycle and a second half unit on the second cycle to indicate the full fare.

It is to be noted that the bell is rung once for the .900 token and nickel and twice for the dime and .650 token. The ejection of the check always occurs near the end of the final stroke of the final cycle as does the registration of the check on the register, whereas the bell is rung at the end of the first stroke in each cycle.

A suitable light 507 and a switch 506 are provided for illuminating the displayed check.

Gage block control mechanism

In the case of large checks such as a quarter, the leading edge of such check as it is forced down toward the calipering station, may contact the gage block 119 which may be partially in the check chute. Such contact produces rough operation and throws unnecessary loads upon the various parts of the machine.

To prevent such contact, the gage block may be provided with a pin 601 which has a wedge-shaped projection 603 (see Figures 28 and 29). A spring strip 605 is fixed, by means of a screw 606, to the side of the box 393 which is adjacent the gage block, and is yieldably held into contact with the side of the box by a compression spring 607 which is mounted on a screw 609.

The spring strip is offset, both laterally and edgewise, at 611 and is provided with a knife edge 613 which is adapted to cooperate with the projection 603.

In operation, as the box 393 descends, the lower portion of the blade rides down between the projection 603 and the box and holds the gage block out of the chute until the check box has descended far enough for the check pushers to place a large check low enough to prevent the described contact of the gage block and check. The point at which the gage block may enter the chute is determined by the point at which the projection 601 clears the knife edge.

Upon the return stroke of the box, the projection will normally lie between the blade and the box until the blade is cleared from the projection. However, the blade is yieldable in either direction and will give in case heavy pressure is exerted on the gage block and the projection 603.

The projection is tapered downwardly to a knife edge, and this edge and the knife edge on the blade insure that the box will not be stopped by contact of the blade and projection on the upward stroke of the box. The lower end of the blade extends outwardly, as shown in the drawings, so that the blade will be moved against spring 607 if the blade and projection should engage upon downward movement of the box.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a fare collection apparatus the combination of means for measuring the diameter of a check, an actuator, a plurality of register operating slide bars having projections disposed adjacent said actuator, an interponent adapted to be approximately positioned by said measuring means to connect said actuator with the bar corresponding to the check measured said interponent being mounted for positioning movement independently of said check measuring means and means for moving said interponent to accurately position it adjacent a projection.

2. In a fare collection apparatus, the combination of check measuring means having a gage lever settable to any one of a plurality of positions in accordance with the diameter of the check measured, a second lever mounted on a fulcrum and having a control arm operatively connected with said gage lever and a second arm provided with an interponent, means mounting said fulcrum for translation to and from a normal position, an actuator having a plurality of notches adapted to receive said interponent, a plurality of register actuating slides provided with actuating projections disposed one adjacent each notch so that one projection will be engaged by the interponent when it is received in a notch, and means for moving said fulcrum to normal position to cause movement of said interponent past said notches and into position to be engaged by a notch, the amplitude of movement of said interponent being controlled by the amount of movement of said control arm.

3. In a fare collection apparatus, the combination of check measuring means having a gage lever settable to any one of a plurality of positions in accordance with the diameter of the check measured, a second lever mounted on a fulcrum and having a control arm operatively connected with said gage lever and a second arm provided with an interponent, means mounting said fulcrum for translation to and from a normal position, an actuator having a plurality of notches adapted to receive said interponent, a plurality of register actuating slides each provided with an actuating projection which is disposed adjacent a notch so that one projection will be engaged by the interponent when it is received in a notch, means for moving said fulcrum to normal position to cause movement of said interponent past said notches and into position to be engaged by a notch, the amplitude of movement of said interponent being controlled by the amount of movement of said control arm, said fulcrum moving means also holding said fulcrum in normal position until said interponent engages the selected notch.

4. In a fare collection apparatus, the combination of check measuring means having a gage lever settable to any one of a plurality of positions in accordance with the diameter of the check measured, a lever mechanism comprising two parts lever mounted on a fulcrum and having, as one part, a control arm operatively connected with said gage lever and, as another part, a second arm provided with an interponent, means mounting said fulcrum for translation to and from a normal position, an actuator having a plurality of notches adapted to receive said interponent, a plurality of register actuating slides each provided with an actuating projection disposed one adjacent each of said notches so that one projection will be engaged by the interponent when it is received in a notch, means for moving said fulcrum to normal position to cause movement of said interponent past said notches and into position to be engaged by a notch, the amplitude of movement of said interponent being controlled by the amount of movement of said control arm, means for normally, relatively positioning said control arm and said second arm comprising a yieldable connection between said control arm and said second arm, and bevelled teeth disposed between said notches whereby said interponent may be accurately positioned independently of said control arm.

5. In a fare collection apparatus, the combination of check measuring means having a gage lever settable to any one of a plurality of positions in accordance with the diameter of the check measured, a second lever mounted on a fulcrum and having a control arm operatively connected with said gage lever and a second arm provided with an interponent, means mounting said fulcrum for translation to and from a normal position, an actuator having a plurality of notches adapted to receive said interponent, a plurality of register actuating slides each provided with an actuating projection disposed adjacent a notch so that one projection will be engaged by the interponent when it is received in a notch, means for moving said fulcrum to normal position to cause movement of said interponent past said notches and into position to be engaged by a notch, the amplitude of movement of said interponent being controlled by the amount of movement of said control arm, and means connected with said actuator for resetting said slides to starting position during the positioning of said interponent.

6. In a fare registering apparatus, a register, a slide, means connecting said register with said slide for operation thereby, means for operating said slide in response to the deposit of a check, a second slide mounted in the same plane as said first slide, means for actuating said second slide in response to the deposit of a check of different diameter, and means for connecting said second slide to actuate the first slide and through it, the register.

7. In a fare registering apparatus, a register, a slide, means connecting said register with said slide for operation thereby, means for operating said slide in response to the deposit of a check, a second slide mounted in the same plane as said first slide, means for actuating said second slide in response to the deposit of a check of different diameter, and means for connecting said second slide to actuate the first slide and through it, the register and a repeating mechanism, actuated by said second slide for causing a second operation of said second slide and of said registering mechanism.

8. In a fare registering mechanism, an anvil, a gage lever, means for positioning a check edgewise between said anvil and lever, a second lever connected with said gage lever, a fulcrum, a control lever mounted on the fulcrum and connected with said second lever by a slotted link, an interponent lever mounted on said fulcrum, stop means on said control and interponent levers to prevent relative movement therebetween in one direction, a spring to hold said stop means in engagement, a slot, said fulcrum being mounted for motion in said slot, means for moving said fulcrum in said slot in a direction away from said second lever and for rotating said control lever away from said second lever, whereby said interponent lever will be rotated about said fulcrum to a position determined by the position of said gage lever.

9. In a fare registering mechanism, an anvil, a gage lever, means for positioning a check edgewise between said anvil and lever, a second lever connected with said gage lever, a control lever mounted on a fulcrum and connected with said second lever by a slotted link, an interponent lever mounted on said fulcrum, stop means on said control and interponent levers to prevent relative movement therebetween in one direction, a spring to hold said stop means in engagement, a slot, said fulcrum being mounted for motion in said slot, means for moving said fulcrum in said slot in a direction away from said second lever, and means for acting on said control lever in a direction to force it away from said second lever, whereby said interponent lever will be rotated about said fulcrum to a position determined by the position of said gage lever.

10. In a fare collection apparatus the combination of a check handling mechanism comprising contacts forming a gap adapted to be closed by a deposited check, a solenoid, an armature disposed to be operated thereby through a working stroke, said solenoid being connected in an electric circuit with said gap, a switch connected in parallel with the gap, and means operated by said armature for closing said switch during the early part of the working stroke of said armature and means for opening said switch near the end of said stroke.

11. In a fare collection apparatus the combination of a check handling mechanism comprising contacts forming a gap adapted to be closed by a deposited check, a solenoid, an armature disposed to be operated thereby through a working stroke, means for returning said armature, said solenoid being connected in circuit with said gap, a switch connected in parallel with the gap, means operated by said armature for closing said switch during the early part of the working stroke of said armature and means for opening said switch near the end of said stroke, and means, controlled by said check and actuated by said armature upon return thereof, for reclosing said switch to cause a second working stroke of said armature.

12. In a fare collection apparatus the combination of a check handling mechanism comprising contacts forming a gap adapted to be closed by a deposited check, a solenoid, an armature disposed to be operated thereby through a working stroke, means for returning said armature, said solenoid being connected in circuit with said gap, a switch connected in parallel with the gap, means operated by said armature for closing said switch on the working stroke of said armature and means for opening said switch near the end of said stroke, means, actuated by said armature upon return thereof and controlled by check selected means, for reclosing said switch to cause a second working stroke of said armature, and means for thereafter rendering said switch reclosing means ineffective.

13. In a fare collection apparatus the combination of check handling and measuring means, an interponent, means for positioning said interponent in accordance with the diameter of the check being measured, a plurality of slides, actuating means, said interponent when positioned serving to select a slide and connect it with the actuating means, a switch, a stop on said actuating means for motion relative thereto, to and from active and inactive positions and adapted when in active position to close said switch when said actuating means is moved, a settable cam mechanism, means controlled by said mechanism for moving said stop successively to active and inactive positions, and means, including elements on said bars, for controlling the setting of said cam mechanism.

14. In a fare collection apparatus the combination of check handling and measuring means, an interponent, means for positioning said interponent in accordance with the diameter of the check being measured, a plurality of slides, registers operable by certain of said slides, actuating means, said interponent when positioned serving to select a slide and connect it with the actuating means, a switch, a stop mounted on said actuating means and movable relative thereto, into and out of active and inactive positions and adapted when in active position to close said switch when said actuating means is moved, a settable cam mechanism, means controlled by said mechanism for moving said stop to said position, means, including elements on said bars, for setting said cam mechanism, said check handling means comprising releasable means for holding said check connected to be driven by said actuating means and adapted to be released at a predetermined point in the motion of said actuating means, a fixed abutment, said stop being constructed and arranged when in active position to contact said abutment to prevent movement of said actuating means to the point at which said holding means is released.

15. In a fare collection apparatus the combination of check handling and measuring means, an interponent, means for positioning said interponent in accordance with the diameter of the check being measured, a plurality of slides, registers operable by certain of said slides, actuating means, said interponent when positioned serving to select a slide and connect it with the actuating means for operation thereby, a switch, a stop mounted on said actuating means and movable relative thereto, to and from active and inactive positions and adapted when in active position to close said switch, a cam settable mechanism, means controlled by said mechanism for moving said stop to said positions, means, including elements on said bars, for setting said cam mechanism, said check handling means comprising releasable means for holding said check connected to be driven by said actuating means and adapted to be released at a predetermined point in the motion of said actuating means, a fixed abutment, said top being constructed and arranged when in active position to contact said abutment to prevent movement of said actuating means to a point at which said holding means is released, means connected with said actuating means for resetting the operated slide, said stop also being adapted to close said switch, and means energized by said switch to cause a second operation of said actuating means to again operate the same slide.

16. In a fare collection apparatus, the combination of check measuring means having a gage lever settable to any one of a plurality of positions in accordance with the diameter of the check measured, a second lever mounted on a fulcrum and having a control arm connected with said gage lever by means of a lost motion linkage and a second arm provided with an interponent, means mounting said fulcrum for translation to and from a normal position, an actuator having a plurality of notches adapted to receive said interponent, a plurality of register actuating slides each provided with an actuating projection which is disposed adjacent a notch so that one projection will be engaged by the interponent when it is received in a notch, means for moving said fulcrum to normal position to cause movement of said interponent past said notch and into position to be engaged by a notch, the amplitude of movement of said interponent being controlled by the amount of movement of said control arm, said fulcrum moving means also holding said fulcrum in normal position until said interponent engages the selected notch.

17. In a fare registering apparatus, a register, a slide, means connecting said register with said slide for operation thereby, means for operating said slide in response to the deposit of a check, a second slide mounted adjacent said first slide, means for actuating said second slide in response to the deposit of a check of different diameter, and means for connecting said second slide to actuate the first slide and through it, the register.

18. In a fare registering apparatus, a register, a slide, means connecting said register with said slide for operation thereby, means for operating said slide in response to the deposit of a check, a second slide mounted adjacent said first slide, means for actuating said second slide in response to the deposit of a check of different diameter, and means for connecting said second slide to actuate the first slide and through it, the register, and a repeating mechanism, actuated by said second slide for causing a second operation of said second slide and of said registering mechanism.

ERNEST H. THOMPSON.